United States Patent Office 3,303,195
Patented Feb. 7, 1967

3,303,195
METHYLATED DESERPIDINE
Leon Velluz, Paris, and Georges Muller, Nogent-sur-Marne, France,, assignors to Roussel-UCLAF, Paris, France, a corporation of France
No Drawing. Filed Nov. 30, 1965, Ser. No. 510,660
Claims priority, application France, Oct. 31, 1957, 750,639
1 Claim. (Cl. 260—287)

This application is a continuation-in-part of our co-pending application Serial No. 119,786, filed June 27, 1961, which in turn in a continuation-in-part of patent application Serial No. 727,777, filed April 11, 1958, both now abandoned.

The present invention relates to a new and valuable 20α-yohimbane compound and more particularly to a substituted 20α-yohimbane compound of the reserpine series and to a process of preparing the same.

In particular this invention relates to a levorotatory (chloroform) substituted deserpidine of the structural formula:

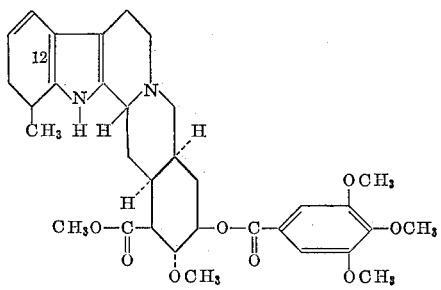

and to processes of preparing the same.

20α-yohimbane compounds of the reserpine series are of considerable interest as physiologically active compounds having noteworth pharmacodynamic properties. In short-time acute tests with blood pressure hypertensive rats 12-methyl deserpidine, given orally, works clear hypotensive effects at a dose equal to about a fifth of that which was to be given, either of 10-methoxy deserpidine or reserpine.

In longer time test performed subcutaneously as well as orally, 12-methyl deserpidine works a complete anti-hypertensive effect. On the other hand, 12-methyl deserpidine works in rats a fifth of the neuro-depressant effects worked by reserpine. In dogs, its sedative effects are practically insignificant at a dose equal to six times that of reserpine.

12-methyl deserpidine, given at a high dose, does not bring about any diarhoea nor any Parkinson type tremors.

12-methyl deserpidine, lastly, has the twentieth (1/20), or even less of the toxicity of reserpine in acute toxicity tests, and the tenth (1/10), or even less, of it, in chronic toxicity tests.

It is an object of the present invention to obtain a new and valuable substituted 20α-yohimbane of the reserpine series having valuable properties.

Another object of the invention is to obtain a levo-rotatory (chloroform) substituted deserpidine of the structural formula:

A further object of the invention is to provide a simple and effective process of preparing 12-methyl deserpidine.

A still further object of the invention is to obtain new intermediates useful in the preparation of said 12-methyl deserpidine.

These and other objects of the invention will become more apparent as the description thereof proceeds.

In principle, the present invention relates to the levorotatory (chloroform) 12-methyl deserpidine.

Levorotatory (chloroform) 12-methyl deserpidine has a melting point of 231° C., a specific rotation of $[\alpha]_D^{20} = -124° \pm 5°$ (c.=0.5% in chloroform), is soluble in alcohol, acetone, benzene and chloroform, slightly soluble in ether and insoluble in water.

The compound of the invention is prepared according to the reaction schemes of Tables I and II. Table I is a flow diagram showing the method of producing 12-methyl deserpidine starting from 7-methyl tryptamine (Formula I) and the methyl ester of 1β-carboxy methyl-2β-methoxycarbonyl - 3α-methoxy-4β-acetoxy-6β-formyl cyclohexane (Formula II). Table II is a flow diagram showing the method of producing 7-methyl tryptamine.

The methy ester of 1β-carboxymethyl-2β-methoxycarbonyl - 3α-methoxy-4β-acetoxy-6β-formyl cyclohexane is preferably prepared according to United States Patent No. 2,971,978, entitled "Process of Producing 1β-Carboxymethyl - 2β - Methoxycarbonyl-3α-Methoxy-4β-Acetoxy-6β-Formyl Cyclohexane."

TABLE I

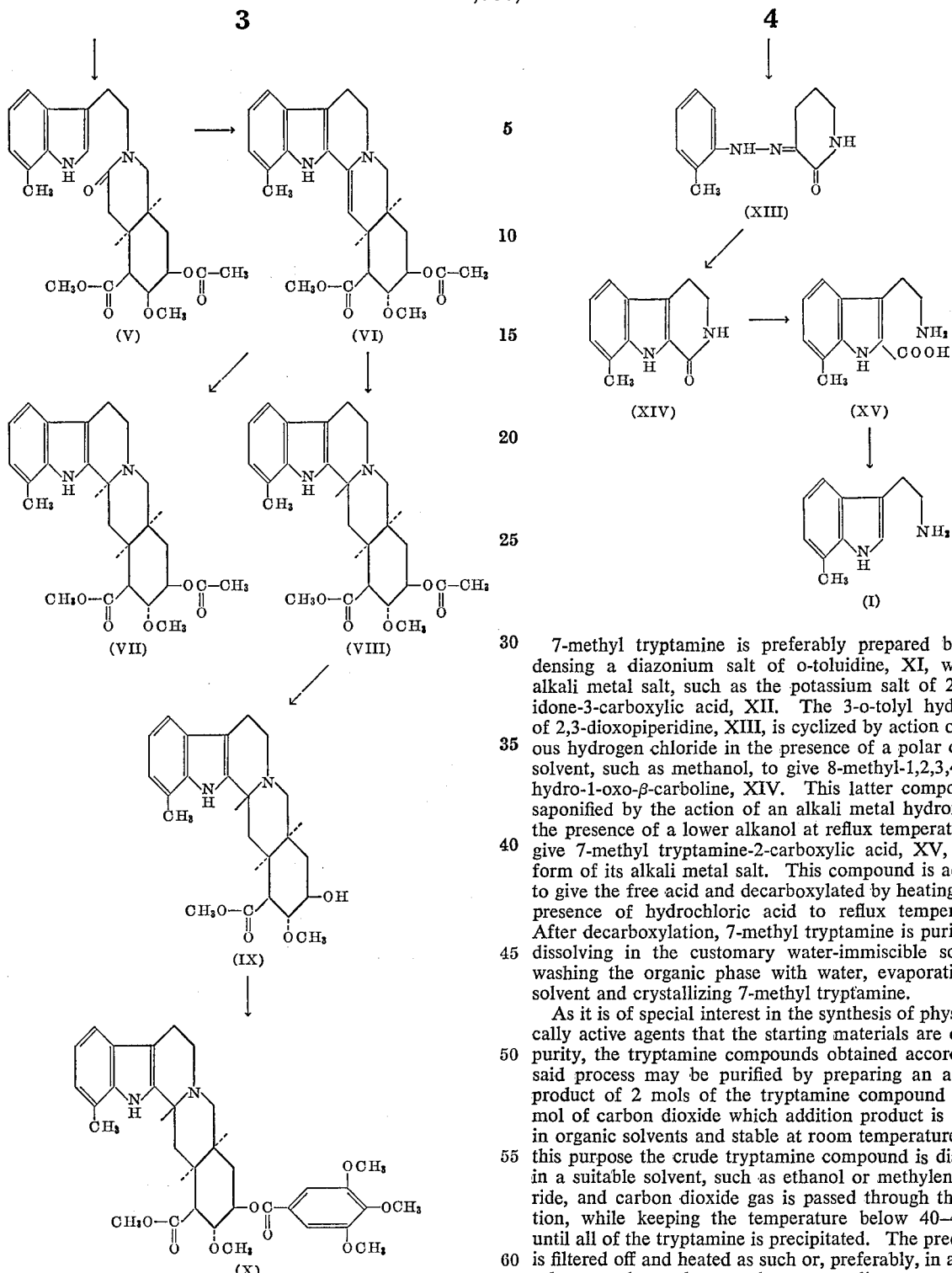

The tryptamine compound of Formula I, 7-methyl tryptamine, is prepared according to the flow diagram of Table II.

TABLE II

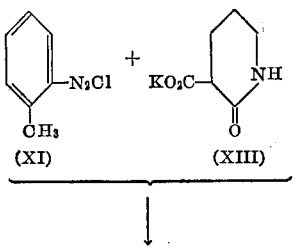

7-methyl tryptamine is preferably prepared by condensing a diazonium salt of o-toluidine, XI, with an alkali metal salt, such as the potassium salt of 2-piperidone-3-carboxylic acid, XII. The 3-o-tolyl hydrazone of 2,3-dioxopiperidine, XIII, is cyclized by action of gaseous hydrogen chloride in the presence of a polar organic solvent, such as methanol, to give 8-methyl-1,2,3,4-tetrahydro-1-oxo-β-carboline, XIV. This latter compound is saponified by the action of an alkali metal hydroxide in the presence of a lower alkanol at reflux temperatures to give 7-methyl tryptamine-2-carboxylic acid, XV, in the form of its alkali metal salt. This compound is acidified to give the free acid and decarboxylated by heating in the presence of hydrochloric acid to reflux temperatures. After decarboxylation, 7-methyl tryptamine is purified by dissolving in the customary water-immiscible solvents, washing the organic phase with water, evaporating the solvent and crystallizing 7-methyl tryptamine.

As it is of special interest in the synthesis of physiologically active agents that the starting materials are of high purity, the tryptamine compounds obtained according to said process may be purified by preparing an addition product of 2 mols of the tryptamine compound with 1 mol of carbon dioxide which addition product is soluble in organic solvents and stable at room temperature. For this purpose the crude tryptamine compound is dissolved in a suitable solvent, such as ethanol or methylene chloride, and carbon dioxide gas is passed through the solution, while keeping the temperature below 40–45° C. until all of the tryptamine is precipitated. The precipitate is filtered off and heated as such or, preferably, in an inert solvent, such as toluene, xylene or tetraline, at a temperature exceeding 80° C. On cooling the pure tryptamine compound crystallizes.

Condensation of 7-methyl tryptamine of Formula I with the monocyclic aldehyde of Formula II is preferably carried out in a neutral solvent, such as methylene chloride or tetrahydrofuran, at about room temperature. Thereby a compound of Formula III is obtained. The compound of Formula III is subjected to the action of an alkali-metal borohydride such as potassium borohydride in the presence of a lower alkanol such as methanol at elevated temperatures whereby the double bond of the Schiff base of Formula III is hydrogenated and ring closure takes place and the compound is partially saponified, thereby the compound of Formula IV is obtained.

The dextrorotatory (in pyridine) 12-methyl-18β-hydroxy - 17α - methoxy - 16β - methoxycarbonyl - 3-oxo-2,3-seco-20α-yohimbane is acetylated by customary methods such as by heating with acetic acid anhydride in the presence of pyridine at reflux temperatures to produce levorotatory (in pyridine) 12-methyl-18β-acetoxy-17α - methoxy - 16β - methoxycarbonyl -3 - oxo - 2,3-seco-20α-yohimbane, V. Said compound V is cyclized by refluxing with phosphorus oxychloride and subsequently treated with ammonia in an acetone media, thus producing levorotatory (in pyridine) 12-methyl-18β-acetoxy-17α - methoxy - 16β - methoxycarbonyl - $\Delta^{3(14)}$ - 20α-yohimbane, VI. Compound VI is converted through reduction by means of zinc in an acidic medium such as aqueous formic acid into levorotatory (in pyridine) 12-methyl - 18β - acetoxy - 17α - methoxy - 16β - methoxycarbonyl-3β,20α-yohimbane, VIII. Its 3α-isomer, VII, which is also obtained by alkali metal borohydride reduction, remains in the mother liquor. Compound VIII, the 3β-isomer, is partially saponified by action of an alkali metal borohydride in the presence of a lower alkanol at reflux temperatures to give levorotatory (in pyridine) 12-methyl - 18β - hydroxy - 17α - methoxy - 16β - methoxycarbonyl-3β,20α-yohimbane, IX.

The compound of Formula IX is then esterified by means of a 3,4,5-trimethoxy benzoic acid derivative such as the chloride or anhydride. When the anhydride is utilized, it is preferably reacted in the presence of a pyridine base and of triethylamine according to the method described in copending application Serial No. 727,782, filed April 11, 1958, and entitled "Process of Esterifying 18-Hydroxy Yohimbanes," now Patent No. 2,926,167. The desired levorotatory (in chloroform) 12-methyl deserpidine, X, is obtained.

The following examples serve to illustrate the present invention without, however, limiting the same thereto. More particularly, many changes and variations in the reaction temperature and duration, in the nature of the solvents, acids and bases used, in the order of introducing the reaction components into the reaction vessel, in the mode of working up the reaction mixture, and of isolating and purifying the reaction product may be made by those skilled in the art in accordance with the principles set forth herein and in the claims annexed hereto.

The melting points given in the examples are instantaneous melting points determined on the Maquenne block.

EXAMPLE I

*Preparation of 7-methyl tryptamine*

65 gm. of o-toluidine are diazotized in dilute hydrochloric acid at 0° C. by means of 53 gm. of sodium nitrite. A solution of the potassium salt of 3-carboxy-2-piperidone, prepared from 100 gm. of 3-carbethoxy-2-piperidone by means of an aqueous solution of 35.3 gm. of potassium hydroxide, is neutralized by the addition of dilute hydrochloric acid and added to the solution of the diazonium compound at 0° C. The mixture is stirred for 6 hours while cooled in an ice bath and allowed to stand at 0° C. overnight. The precipitated tolylhydrazone compound of Formula XIII is filtered with suction, washed with water, and dried in a vacuum. The yield is 107.6 gm. (82% of the theoretical amount) of a crude product which is recrystallized from methanol. Thereby, 91.6 gm. (85% of the theoretical amount) of the pure tolylhydrazone compound XIII are obtained.

2,3-dioxo piperidine-3-(2' - methyl) - phenylhydrazone, XIII, occurs as yellow needles melting at 121° C. They are soluble in alcohol, ether, acetone, benzene and chloroform, and insoluble in water.

Analysis.—Calculated for $C_{12}H_{15}ON_3$ (molecular weight=217.26): C, 66.34%; H, 6.96%; O, 7.36%; N, 19.35%. Found: C, 66.5%; H, 6.9%; O, 7.8%; N, 19.0%.

In order to cause ring closure, 80 gm. of said tolyl hydrazone compound are dissolved in methanol and gaseous hydrochloric acid is passed through the solution for 15 minutes.

Thereafter, the mixture is heated under reflux for half an hour while the passing of hydrochloric acid through the mixture is continued. The solution is allowed to stand at 0° C. overnight. Water is added and the precipitated cyclization product is filtered with suction, washed with water, and dried in a vacuum. 46 gm. (62% of the theoretical amount) of the crystalline 8-methyl-1-oxo-1,2,3,4-tetrahydro-β-carboline compound of Formula XIV are obtained. It may be purified by recrystallization from ethanol.

8-methyl-1,2,3,4-tetrahydro-1-oxo-β-carboline occurs as colorless needles melting at 225° C. They are soluble in hot alcohol, slightly soluble in most organic solvents, and insoluble in water.

Analysis.—Calculated for $C_{12}H_{12}ON_2$ (molecular weight=200.23): C, 71.98%; H, 6.04%; N, 13.99%. Found: C, 71.9%; H, 6.0%; N, 14.2%.

Said carboline compound is converted into 7-methyl-tryptamine-2-carboxylic acid of Formula XV by saponification. For this purpose, 30 gm. of the carboline compound are refluxed with an aqueous ethanol solution of 60 gm. of potassium hydroxide for 4 hours. The mixture is cooled and neutralized by the addition of acetic acid while stirring. After cooling in an ice bath, the precipitated white compound is filtered with suction, washed with water, and dried. The yield of the desired carboxylic acid amounts to 30.5 gm. and, thus, is quantitative. It may directly be used for the next reaction step or it may be recrystallized from water.

7-methyl-tryptamine-2-carboxylic acid occurs as colorless needles, melting at 318° C. They are insoluble in most organic solvents.

For decarboxylation, 30 gm. of said carboxylic acid are dissolved in dilute hydrochloric acid and the solution is refluxed for 2 hours. After cooling, the solution is neutralized by the addition of aqueous sodium hydroxide solution whereby 7-methyl-tryptamine of Formula I precipitates. The mixture is allowed to stand overnight at 0° C. for crystallization. The crystals are filtered off, washed with water, and dried in a vacuum. 19.95 gm. (83% of the theoretical amount) of a crude product are obtained. It is recrystallized from benzene. The yield is 16.70 gm. (84% of the theoretical amount) of colorless needles.

7-methyl-tryptamine melts at 130° C., is insoluble in water, slightly soluble in alcohol and ether, and soluble in acetone, benzene, and chloroform.

Analysis. — Calculated for $C_{11}H_{14}N_2$ (molecular weight=174.24): C, 75.82%; H, 8.10%; N, 16.08%. Found: C, 76.1%; H, 8.2%; N, 16.2%.

EXAMPLE II

*The methyl ester of 12-methyl-18β-acetoxy-17α-methoxy-16β - methoxycarbonyl - 2,3 - 3,4 - diseco - $\Delta^{4(21)}$ - 20α-yohimbene-3-carboxylic acid of Formula III*

2.27 gm. of levorotatory 1β-carboxymethyl-2β-methoxycarbonyl-3α-methoxy-4β-acetoxy-6β-formyl cyclohexane, II, are suspended in 15 cc. of anhydrous ether. After cooling in an ice bath, 25 cc. of a solution of diazomethane in methylene chloride are added within 10 minutes. The resulting homogeneous solution is allowed to stand for 10 minutes in ice and is then evaporated to dryness in a vacuum. The residue is dissolved in 5 cc. of tetrahydrofuran. 1 gm. of 7-methyl tryptamine dissolved in 5 cc. of tetrahydrofuran is added thereto. The reaction mixture is allowed to stand at 30° C. for 30 minutes and is then evaporated to dryness in a vacuum. The resinous residue represents the desired methyl ester. It is used without further purification for the next reaction step.

EXAMPLE III

*Dextrorotatory 12-methyl-18β-hydroxy-17α-methoxy-16β-methoxycarbonyl-3-oxo-2,3 - seco - 20α - yohimbane of Formula IV*

The resinous methyl ester obtained as described in the preceding example is dissolved in 20 cc. of methanol. After cooling to +5° C., 500 mg. of potassium borohydride are added. The reaction mixture is allowed to stand at 0° C. for 15 minutes and is then refluxed for one hour. The resulting solution is concentrated to a volume of 10 cc., cooled to 20° C. and mixed with water until the solution becomes slightly turbid. After cooling in ice, the precipitated crystals are filtered with suction, washed with water, and dried at 90° C. 1.93 gm. (81% of the theoretical amount) of the desired yohimbane compound are obtained. It can be used without further purification for the next reaction step. Purification may be carried out by recrystallization from acetone.

12 - methyl - 16β - methoxycarbonyl - 17α - methoxy-18β-hydroxy-3-oxo-2,3-seco-20α-yohimbane, IV, melts at 180° C. and has a specific rotation $[\alpha]_D^{20} = +25° \pm 5°$ (c.=0.5% in pyridine).

*Analysis.*—Calculated for $C_{23}H_{30}O_5N_2$ (molecular weight=414.49): C, 66.64%; H, 7.30%; O, 19.30%; N, 6.76%. Found: C, 66.7%; H, 7.4%; O, 19.0%; N, 6.8%.

The I.R. spectra confirms the given structure. This compound has not been described in the literature.

EXAMPLE IV

*Preparation of levorotatary 12-methyl-18β-acetoxy-17α-methoxy - 16β - methoxycarbonyl - 3 - oxo - 2,3 - seco-20α-yohimbane (Formula V)*

4.8 cc. of pyridine and 3 cc. of acetic acid anhydride were added to 1.2 gm. of the compound of Formula IV prepared in the preceding example. The mixture was heated to 90° C. for a period of 20 minutes and next distilled to dryness under vacuum. The residue was taken up in a mixture of ether and ethyl acetate from which it crystallized. The crystals were vacuum filtered, washed and dried at 90° C. Yield: 1.215 gm. (being 93% of Compound V) with a melting point of 226° C. The compound is used as such for the cyclization step. The pure compound is prepared by recrystallizing from acetone. The compound occured in the form of colorless crystals, was soluble in alcohol and chloroform, slightly soluble in acetone and insoluble in water and ether, and has a specific rotation $[\alpha]_D^{20} = -14° \pm 5°$ (c.=0.5% in pyridine).

*Analysis.*—Calculated for $C_{25}H_{32}O_6N_2$ (molecular weight=456.52): C, 65.77%; H, 7.07%; N, 6.14%; O, 21.03%. Found: C, 66.0%; H, 7.0%; N, 6.3%; O, 21.3%.

Its infrared sepctrum was in accord with the indicated structure. This compound has not been described in the literature.

EXAMPLE V

*Preparation of levorotatory 12 - methyl - 18β - acetoxy-17α - methoxy - 16β - methoxycarbonyl - $\Delta^{3(14)}$ - 20α-yohimbene (Formula VI)*

0.800 gm. of the compound of Formula V, prepared according to the preceding example, were mixed with 2 cc. of phosphorus oxychloride. The mixture was refluxed for 1½ hours. After distilling the reaction mixture to dryness in a vacuum, the residue was taken up in 8 cc. of acetone and concentrated ammonia solution was added in excess at 0° C. The reaction solution was poured into water and was extracted with methylene chloride. The extracts were dried and distilled to dryness under vacuum. The residue was recrystallized from methanol. The crystals were vacuum filtered, washed with methanol and dried at 80° C. 635 mgm. of crystals of the compound of Formula VI were obtained, melting at 250° C. and directly useable in the next step. Yield: 83% of the theoretical yield. The pure compound was obtained by solution in ether, concentration, vacuum filtering and drying at 80° C.

This compound, which was new, occurred in the form of clear, yellow, hexagonal crystals, soluble in acetone and chloroform, slightly soluble in alcohol and ether and had a specific rotation $[\alpha]_D^{20} = -19° \pm 10°$ (c.=0.5% in pyridine).

*Analysis.*—Calculated for $C_{25}H_{30}O_5N_2$ (molecular weight =438.51): C, 68.47%; H, 6.90%; O, 18.24%; N, 6.39%. Found: C, 68.2%; H, 6.8%; O, 18.3%; N, 6.4%.

The I.R. spectra is in accord with the given structure and shows, in particular, the presence of a double bond by a band at 1639 cm.$^{-1}$.

EXAMPLE VI

*Preparation of the levorotatory 12 - methyl - 18β - acetoxy - 17α - methoxy - 16β - methoxycarbonyl - 3α, 20α-yohimbane (Formula VII)*

150 mgm. of the compound of Formula VI, prepared according to the preceding example, 4.5 cc. of methanol and 0.45 cc. of 2 N hydrochloric acid were mixed and the mixture was cooled with ice. Sodium borohydride is introduced into this solution at +5° C. in excess. Decoloration was observed followed by crystallization. After addition of 4.5 cc. of water, the crystals were vacuum filtered, washed with water and methanol and dried at 90° C.

136 mgm. of the 3α-isomer of Formula VII were obtained. The yield is 90% of the theoretical yield. The pure compound was recrystallized from aqueous acetone. Its melting point was 295° C. and it had a specific rotation $[\alpha]_D^{20} = -192° \pm 5°$ (c.=0.5% in pyridine). It occurred in the form of colorless needles, was soluble in acetone and chloroform and very slightly soluble in alcohol and ether.

Its I.R. spectra confirmed the given structure. This compound is not described in the literature.

EXAMPLE VII

*Preparation of levorotatory 12-methyl-18β-acetoxy-17α-methoxy - 16β - methoxycarbonyl - 3β,20α-yohimbane (Formula VIII)*

15 gm. of the compound of Formula VI, prepared according to Example V, were mixed with 150 cc. of water and 150 cc. of technical formic acid. The reaction mixture was cooled to +5° C. and 30 gm. of zinc powder were added. After 15 minutes at +5° C., the temperature was raised to 15° C. and the agitation continued for a period of 2 hours. The mixture was vacuum filtered with the aid of a filtration aid. The filter cake was washed with water and the filtrate and wash liquors were poured on ice. Ammonia was added to excess and the mixture was extracted with methylene chloride. The extracts were combined, dried and the solvent distilled to dryness under vacuum. The residue was taken up in ethyl acetate, vacuum filtered, washed and dried at 90° C. 7.2 gm. of levorotatory 12 - methyl-18β-acetoxy-17α-methoxy-16β-methoxycarbonyl-3β,20α-yohimbane, VIII, were obtained. On recrystallization from acetone by dissolution and concentration, 3.72 gm. of pure crystals of the compound of Formula VIII were obtained. The yield was 25% of the theoretical yield. This compound, which was new, has a melting point of 267° C. and a specific rotation $$[\alpha]_D^{20} = -93° \pm 5°$$

(c.=0.5% in pyridine). It occurred in the form of colorless needles, was soluble in chloroform, and slightly soluble in alcohol, acetone and ether.

*Analysis.*—Calculated for $C_{25}H_{32}N_2O_5$ (molecular weight=440.52): C, 68.16%; H, 7.32%; N, 6.36%, O, 18.16%. Found: C, 68.2%; H, 7.3%; N, 6.4%; O, 18.3%.

Its I.R. spectra confirmed the given structure and, in particular, distinguished the 3β-configuration of the hydrogen from the 3α-configuration.

EXAMPLE VIII

*Preparation of levorotatory 12-methyl-18β-hydroxy-17α-methoxy - 16β - methoxycarbonyl - 3β,20α-yohimbane (Formula IX)*

1.5 gm. of potassium borohydride were added to 3.72 gm. of the compound of Formula VIII, prepared according to the preceding example, in 150 cc. of methanol. The mixture was refluxed for a period of 1 hour. It was then concentrated to 20 cc. in a vacuum. The concentrated mixture was poured on water and extracted with methylene chloride. The extracts were dried and distilled to dryness. The distillation residue was taken up in ether and was allowed to crystallize on cooling. The crystals were vacuum filtered, washed with ether and dried at 90° C. 2.82 gm. of prismatic crystals of the compound of Formula IX, having a melting point of about 236° C., were obtained. Yield: 84% of the theoretical yield. The pure product for analysis was obtained by recrystallization from a mixture of acetone and petroleum ether. This compound, which had not been previously described in the literature, was soluble in alcohol, acetone and chloroform, slightly soluble in ether and insoluble in water. Specific rotation $[\alpha]_D^{20} = -80° \pm 5°$ (c.=0.5% in pyridine).

*Analysis.*—Calculated for $C_{23}H_{30}O_4N_2$ (molecular weight=398.49): C, 69.32%; H, 7.59%; O, 16.06%; N, 7.03%. Found: C, 69.3%; H, 7.6%; O, 16.3%; N. 7.1%.

Its infrared spectrum confirmed the above indicated structure.

EXAMPLE IX

*Preparation of levorotatory 12-methyl deserpidine (Formula X)*

15 cc. of pyridine and 3.38 gm. of 3,4,5-trimethoxybenzoylchloride were added to 1.5 gm. of the compound of Formula IX, prepared according to the preceding example. This mixture was placed in a sealed tube and heated at 75° C. for 17 hours. It was then cooled to 40° C., 7 cc. of water were added thereto and the temperature of the reaction mixture was kept at 40° C. for a period of 20 minutes. The mixture was poured on ice and acidified with hydrochloric acid. It was then extracted with methylene chloride and the extract was washed, with water, with 1 N ammonia and again with water. After drying, the extract was distilled to dryness in a vacuum. The residue was taken up in 1.5 cc. of ethyl acetate. 15 cc. of ether saturated with water was added thereto and the solution was vacuum filtered. The precipitate was washed with ether and dried at 90° C. 1.89 gm. (being an 85% yield) of a clear brown product was obtained. This product was 12-methyl deserpidine, X.

In order to decolorize, the product was dissolved in methylene chloride and 2 volumes of neutral alumina added thereto. The mixture was agitated for a period of 5 minutes, filtered and distilled to dryness. The product was recrystallized from a mixture of aqueous ether and ethyl acetate and again recrystallized from aqueous acetone.

Levorotatory 12-methyl deserpidine was obtained in the form of colorless prisms which melted at 231° C. and had a specific rotation $[\alpha]_D^{20} = -124° \pm 5°$ (c.=0.5% in chloroform). It was soluble in alcohol, acetone, benzene and chloroform, slightly soluble in ether, and insoluble in water.

*Analysis.*—Calculated for $C_{33}H_{40}O_8N_2$ (molecular weight=592.67): C, 66.87%; H, 6.80%; N, 4.73%; Found: C, 66.8%; H, 7.0%; N, 4.8%.

Its I.R. spectra was in accord with the indicated structure.

This compound has not been described in the literature.

We claim:

12-methyl deserpidine, levorotatory in chloroform.

References Cited by the Examiner
UNITED STATES PATENTS 2,857,385  10/1958  Kuehne _____ 260—286

OTHER REFERENCES

Eiter et al.: Monatshefte für Chemit, volume 81 (1950), pages 404–13.

WALTER A. MODANCE, *Primary Examiner.*

JAMES A. PATTEN, *Assistant Examiner.*